US011797201B2

(12) United States Patent
Islam et al.

(10) Patent No.: US 11,797,201 B2
(45) Date of Patent: *Oct. 24, 2023

(54) HARDWARE-SOFTWARE COLLABORATIVE ADDRESS MAPPING SCHEME FOR EFFICIENT PROCESSING-IN-MEMORY SYSTEMS

(71) Applicant: Advanced Micro Devices, Inc., Santa Clara, CA (US)

(72) Inventors: Mahzabeen Islam, Austin, TX (US); Shaizeen Aga, Santa Clara, CA (US); Nuwan Jayasena, Santa Clara, CA (US); Jagadish B. Kotra, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,278

(22) Filed: May 16, 2022

(65) Prior Publication Data
US 2022/0276795 A1    Sep. 1, 2022

Related U.S. Application Data

(63) Continuation of application No. 17/006,646, filed on Aug. 28, 2020, now Pat. No. 11,487,447.

(51) Int. Cl.
*G06F 12/00* (2006.01)
*G06F 3/06* (2006.01)
(Continued)

(52) U.S. Cl.
CPC .......... *G06F 3/0631* (2013.01); *G06F 3/0604* (2013.01); *G06F 3/0673* (2013.01);
(Continued)

(58) Field of Classification Search
CPC ............ G06F 12/0207; G06F 12/0223; G06F 12/0607
See application file for complete search history.

(56) References Cited

U.S. PATENT DOCUMENTS 9,734,889 B2   8/2017  Mekhiel
11,194,661 B1  12/2021 Kim
(Continued)

OTHER PUBLICATIONS

The International Searching Authority, "Search Report" in Application No. PCT/US2021/044350, dated Nov. 12, 2021, 9 pages.
(Continued)

*Primary Examiner* — John A Lane
(74) *Attorney, Agent, or Firm* — HICKMAN BECKER BINGHAM LEDESMA LLP

(57) ABSTRACT

Approaches are provided for implementing hardware-software collaborative address mapping schemes that enable mapping data elements which are accessed together in the same row of one bank or over the same rows of different banks to achieve higher performance by reducing row conflicts. Using an intra-bank frame striping policy (IBFS), corresponding subsets of data elements are interleaved into a single row of a bank. Using an intra-channel frame striping policy (ICFS), corresponding subsets of data elements are interleaved into a single channel row of a channel. A memory controller utilizes ICFS and/or IBFS to efficiently store and access data elements in memory, such as processing-in-memory (PIM) enabled memory.

20 Claims, 6 Drawing Sheets

(51) Int. Cl.
*G06F 12/02* (2006.01)
*G06F 12/06* (2006.01)

(52) U.S. Cl.
CPC ...... *G06F 12/0207* (2013.01); *G06F 12/0223* (2013.01); *G06F 12/0607* (2013.01)

(56) References Cited

U.S. PATENT DOCUMENTS

| | | |
|---|---|---|
| 2012/0069664 A1* | 3/2012 | Kim ................ H10B 43/35 365/185.11 |
| 2012/0246395 A1* | 9/2012 | Cho ................ G06F 12/0246 711/E12.008 |
| 2017/0004089 A1 | 1/2017 | Clemons |
| 2018/0276150 A1 | 9/2018 | Eckert |
| 2019/0042157 A1 | 2/2019 | Bonen et al. |
| 2019/0179740 A1 | 6/2019 | Ware |
| 2020/0089605 A1 | 3/2020 | Byun |
| 2020/0143872 A1 | 5/2020 | Raad |
| 2021/0011725 A1 | 1/2021 | Park |
| 2021/0133100 A1 | 5/2021 | Artieri et al. |
| 2021/0333999 A1 | 10/2021 | Park |
| 2022/0066662 A1 | 3/2022 | Islam et al. |

OTHER PUBLICATIONS

Islam, U.S. Appl. No. 17/006,646, filed Aug. 28, 2020, Notice of Allowance and Fees Due, dated Feb. 11, 2022.

* cited by examiner

Channel 0
Bank 0

|    | C0 | C1  | C2  | C3  | C4  | C5  | C6  | C7  |
|----|----|-----|-----|-----|-----|-----|-----|-----|
| R0 | A0 | A8  | A16 | A24 | A32 | A40 | A48 | A56 |
| R1 | B0 | B8  | B16 | B24 | B32 | B40 | B48 | B56 |
| R2 | C0 | C8  | C16 | C24 | C32 | C40 | C48 | C56 |
| R3 | D0 | D8  | D16 | D24 | D32 | D40 | D48 | D56 |

FIG. 4B

Channel 0
Bank 0

|    | C0  | C1  | C2  | C3  | C4  | C5  | C6  | C7  |
|----|-----|-----|-----|-----|-----|-----|-----|-----|
| R0 | A2  | A8  | B0  | B8  | C0  | C8  | D0  | D8  |
| R1 | A16 | A26 | B16 | B24 | C16 | C24 | D16 | D24 |
| R2 | A32 | A40 | B32 | B40 | C32 | C40 | D32 | D40 |
| R3 | A48 | A56 | B48 | B56 | C48 | C56 | D48 | D56 |

FIG. 5A

Channel 0

Bank 0

| | C0 | C1 | C2 | C3 | C4 | C5 | C6 | C7 |
|---|---|---|---|---|---|---|---|---|
| R0 | A0 | A8 | A16 | A24 | A32 | A40 | A48 | A56 |
| R1 | B0 | B8 | B16 | B24 | B32 | B40 | B48 | B56 |
| R2 | C0 | C8 | C16 | C24 | C32 | C40 | C48 | C56 |
| R3 | D0 | D8 | D16 | D24 | D32 | D40 | D48 | D56 |

Bank 1

| | C0 | C1 | C2 | C3 | C4 | C5 | C6 | C7 |
|---|---|---|---|---|---|---|---|---|
| R0 | A4 | A12 | A20 | A28 | A34 | A42 | A50 | A58 |
| R1 | B4 | B12 | B20 | B28 | B34 | B42 | B50 | B58 |
| R2 | C4 | C12 | C20 | C28 | C34 | C42 | C50 | C58 |
| R3 | D4 | D12 | D20 | D28 | D34 | D42 | D50 | D58 |

Bank 2

| | C0 | C1 | C2 | C3 | C4 | C5 | C6 | C7 |
|---|---|---|---|---|---|---|---|---|
| R0 | A4 | A12 | A20 | A28 | A36 | A44 | A52 | A60 |
| R1 | B4 | B12 | B20 | B28 | B36 | B44 | B52 | B60 |
| R2 | C4 | C12 | C20 | C28 | C36 | C44 | C52 | C60 |
| R3 | D4 | D12 | D20 | D28 | D36 | D44 | D52 | D60 |

Bank 3

| | C0 | C1 | C2 | C3 | C4 | C5 | C6 | C7 |
|---|---|---|---|---|---|---|---|---|
| R0 | A6 | A14 | A22 | A30 | A38 | A46 | A54 | A62 |
| R1 | B6 | B14 | B22 | B30 | B38 | B46 | B54 | B62 |
| R2 | C6 | C14 | C22 | C30 | C38 | C46 | C54 | C62 |
| R3 | D6 | D14 | D22 | D30 | D38 | D46 | D54 | D62 |

FIG. 5B

Channel 0

Bank 0

| | C0 | C1 | C2 | C3 | C4 | C5 | C6 | C7 |
|---|---|---|---|---|---|---|---|---|
| | A0 | A8 | A16 | A24 | A32 | A40 | A48 | A56 |
| | A2 | A10 | A18 | A26 | A34 | A42 | A50 | A58 |
| | A4 | A12 | A20 | A28 | A36 | A4 | A52 | A60 |
| | A6 | A14 | A22 | A30 | A38 | A46 | A54 | A62 |

Bank 1

| | C0 | C1 | C2 | C3 | C4 | C5 | C6 | C7 |
|---|---|---|---|---|---|---|---|---|
| | B0 | B8 | B16 | B24 | B32 | B40 | B48 | B56 |
| | B2 | B10 | A18 | B26 | B34 | B42 | B50 | B58 |
| | B4 | B12 | A20 | B28 | B36 | B44 | B52 | B60 |
| | B6 | B14 | A22 | B30 | B38 | B46 | B54 | B62 |

Bank 2

| | C0 | C1 | C2 | C3 | C4 | C5 | C6 | C7 |
|---|---|---|---|---|---|---|---|---|
| | C0 | C8 | C16 | C24 | C32 | C40 | C48 | C56 |
| | C2 | C10 | C18 | C26 | C34 | C42 | C50 | C58 |
| | C4 | C12 | C20 | C28 | C36 | C44 | C52 | C60 |
| | C6 | C14 | C22 | C30 | C38 | C46 | C54 | C62 |

Bank 3

| | C0 | C1 | C2 | C3 | C4 | C5 | C6 | C7 |
|---|---|---|---|---|---|---|---|---|
| | D0 | D8 | D16 | D24 | D32 | D40 | D48 | D56 |
| | D2 | D10 | D18 | D26 | D34 | D42 | D50 | D58 |
| | D4 | D12 | D20 | D28 | D36 | D44 | D52 | D60 |
| | D6 | D14 | D22 | D30 | D38 | D46 | D54 | D62 |

# HARDWARE-SOFTWARE COLLABORATIVE ADDRESS MAPPING SCHEME FOR EFFICIENT PROCESSING-IN-MEMORY SYSTEMS

CLAIM OF PRIORITY

This application claims the benefit as a Continuation of prior U.S. patent application Ser. No. 17/006,646, titled "Hardware-Software Collaborative Address Mapping Scheme for Efficient Processing-In-Memory Systems", filed Aug. 28, 2020, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Data access latency at the dynamic random-access memory (DRAM) bank-level is significant due to the physics of DRAM cells and supporting peripheral circuitry. Each DRAM bank contains a row-buffer where a single row from a 2D memory array that is stored in the respective bank can be read out at a time. To access a data element stored inside a bank, a row of a 2D memory array containing the data element needs to be activated and then read out into a row-buffer. The data element can then be accessed from the row-buffer. To access any next data element that falls into another row, a pre-charge operation must be performed before a next row can be activated. This situation is commonly known as row-conflict. Such row activate-precharge-activate cycles impose rigid timing requirements of tens of nanoseconds which must be followed to ensure the integrity of the stored data as well as power management.

One way to avoid row-conflicts is to access as many data elements as possible from a same row. However, there is no guarantee that the adjacent data elements which fall into the same operating system page or contiguous physical address space, i.e. a frame, will always be accessed together. The placement of data elements inside physical memory modules, i.e., DRAM channel, bank, row and column, depends on the physical address to physical memory mapping schemes employed by a memory controller that controls access to the DRAM. Generally, to achieve memory level parallelism (MLP), data elements from a same page are interleaved over an available number of channels. However, a naïve interleaving may lead to excessive row-conflicts when performing operations that involve operands from different pages. Thus, there is a need for a better approach for addressing row-conflicts in computer memory.

BRIEF DESCRIPTION OF THE DRAWINGS

Embodiments are depicted by way of example, and not by way of limitation, in the figures of the accompanying drawings and in which like reference numerals refer to similar elements.

FIG. 2 depicts a memory system with two channels.

FIG. 4A depicts channel-0, bank-0 of PIM-enabled memory with address interleaving memory mapping.

FIG. 4B depicts channel-0, bank-0 of PIM-enabled memory with IBFS (intra-bank frame striping) address mapping.

FIG. 5A depicts channel-0 of PIM-enabled memory with address interleaving memory mapping.

FIG. 5B depicts channel-0 of PIM-enabled memory with ICFS (intra-channel frame striping) address mapping.

DETAILED DESCRIPTION

In the following description, for the purposes of explanation, numerous specific details are set forth in order to provide a thorough understanding of the embodiments. It will be apparent, however, to one skilled in the art that the embodiments are able to be practiced without these specific details. In other instances, well-known structures and devices are depicted in block diagram form in order to avoid unnecessarily obscuring the embodiments.

I. Overview
II. Architecture
III. Address Mapping Schemes
  A. Address Interleaving Memory Mapping Scheme
  B. Intra-Bank Frame Striping Policy
  C. Intra-Channel Frame Striping Policy
  D. Implementation Details
  E. Example Procedure
  F. Applications I. Overview Approaches are provided for implementing hardware-software collaborative address mapping schemes that enable mapping data elements used by memory instructions, which are accessed together, in the same row of one bank or over the same rows of different banks to achieve higher processing performance by reducing row conflicts. In one embodiment, using an intra-bank frame striping policy (IBFS), corresponding subsets of data elements are interleaved into a single row of a bank. In another embodiment, using an intra-channel frame striping policy (ICFS), corresponding subsets of data elements are interleaved into a single channel row of a channel. A memory controller utilizes IBFS or ICFS to efficiently store and access data elements in memory, such as processing-in-memory (PIM)-enabled memory, depending on the placement of the PIM execution units inside memory banks or channels, respectively.

Although embodiments are described herein in context of PIM-enabled memory systems, such embodiments are not limited to PIM-enabled memory systems per se and are capable of being applied to other memory systems.

The approaches discussed herein achieve a reduction in number of row activations with IBFS and ICFS policies, respectively, as compared to existing techniques while concurrently accessing data elements corresponding to large data structures. Such reductions lead to superior PIM performance and energy efficiency.

II. Architecture

Figure 1:
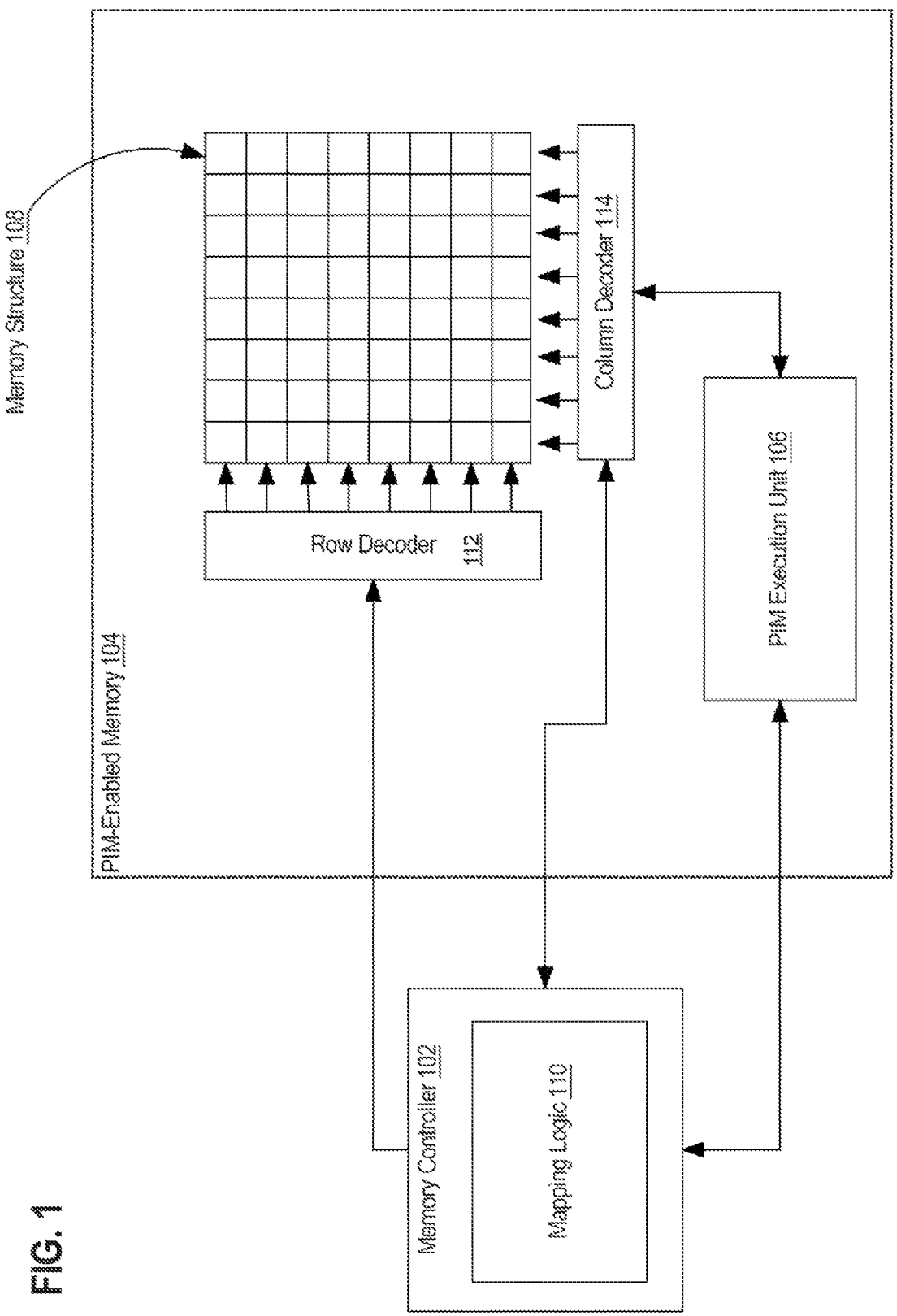
FIG. 1 is a block diagram that depicts a memory controller coupled to processing-in-memory (PIM)-enabled memory for implementing collaborative address mapping schemes as described herein.

FIG. 1 is a block diagram that depicts a memory controller 102 coupled to processing-in-memory (PIM)-enabled memory 104 for implementing collaborative address mapping schemes as described herein.

FIG. 1 includes a memory controller 102 and PIM-enabled memory 104. PIM-enabled memory 104 includes a PIM execution unit 106 and a memory structure 108. In one embodiment, memory structure 108 comprises a bank. In another embodiment, memory structure 108 comprises a channel that includes a plurality of banks. In such an embodiment, PIM execution unit is coupled to memory structure 108 comprising a channel with a plurality of banks.

Memory controller 102 includes mapping logic 110 that is configured to manage the storage and access of data elements in memory structure 108. Using mapping logic 110, memory controller 102 identifies specific row index values and column index values to store and access data elements in memory structure 108. For example, mapping logic 110 may implement an intra-bank frame striping (IBFS) policy that provides logic to store data elements in a bank in a specific configuration. Such logic may also be used to access such data elements from the bank once they are stored. In another example, mapping logic 110 may implement an intra-channel frame striping policy (ICFS) that provides logic to store data elements in a channel in a specific configuration. Such logic may also be used to access such data elements from the channel once they are stored. Mapping logic 110 is implemented by computer hardware, computer software, or any combination of computer hardware and computer software. In some embodiments, mapping logic is stored externally to memory controller 102 and used by memory controller 102 to perform the operations described herein.

PIM-enabled memory 104 includes a memory structure 108 with a row decoder 112 and column decoder 114. Memory structure 108 is coupled to a PIM Execution Unit 106. Row decoder 112 receives a row index value from memory controller 102 and is configured to decode the received row index value to identify a row of the memory structure 108 that corresponds to the received row index value. Column decoder 114 receives a column index value from memory controller 102 and is configured to decode the received column index value to identify a column of the memory structure 108 that corresponds to the received column index value. A combination of the decoded row index value and decoded column index value are used to retrieve a value from the corresponding cell of memory structure 108. The retrieved value from a cell is sent to PIM execution unit 106 or back to memory controller 102 depending on the operation. PIM execution unit includes logic to generate a result based upon the values and transmit the result to memory structure 108 and/or to memory controller 102.

In some embodiments, memory structure 108 comprises a channel that includes multiple banks. In such embodiments, separate row decoder 112 and column decoder 114 are associated with each of the multiple banks of the channel. The memory controller 102 includes logic to transmit a bank index value to choose a bank from the multiple banks and then transmit a row index value and column index value to open a row and access a data element. The retrieved data element is sent to PIM execution unit 106 or back to memory controller 102 depending on the operation. PIM execution unit includes logic to generate a result based upon the data elements and transmit the result to memory structure 108 and/or to memory controller 102

III. Address Mapping Schemes

A. Address Interleaving Memory Mapping Scheme

Figure 2:
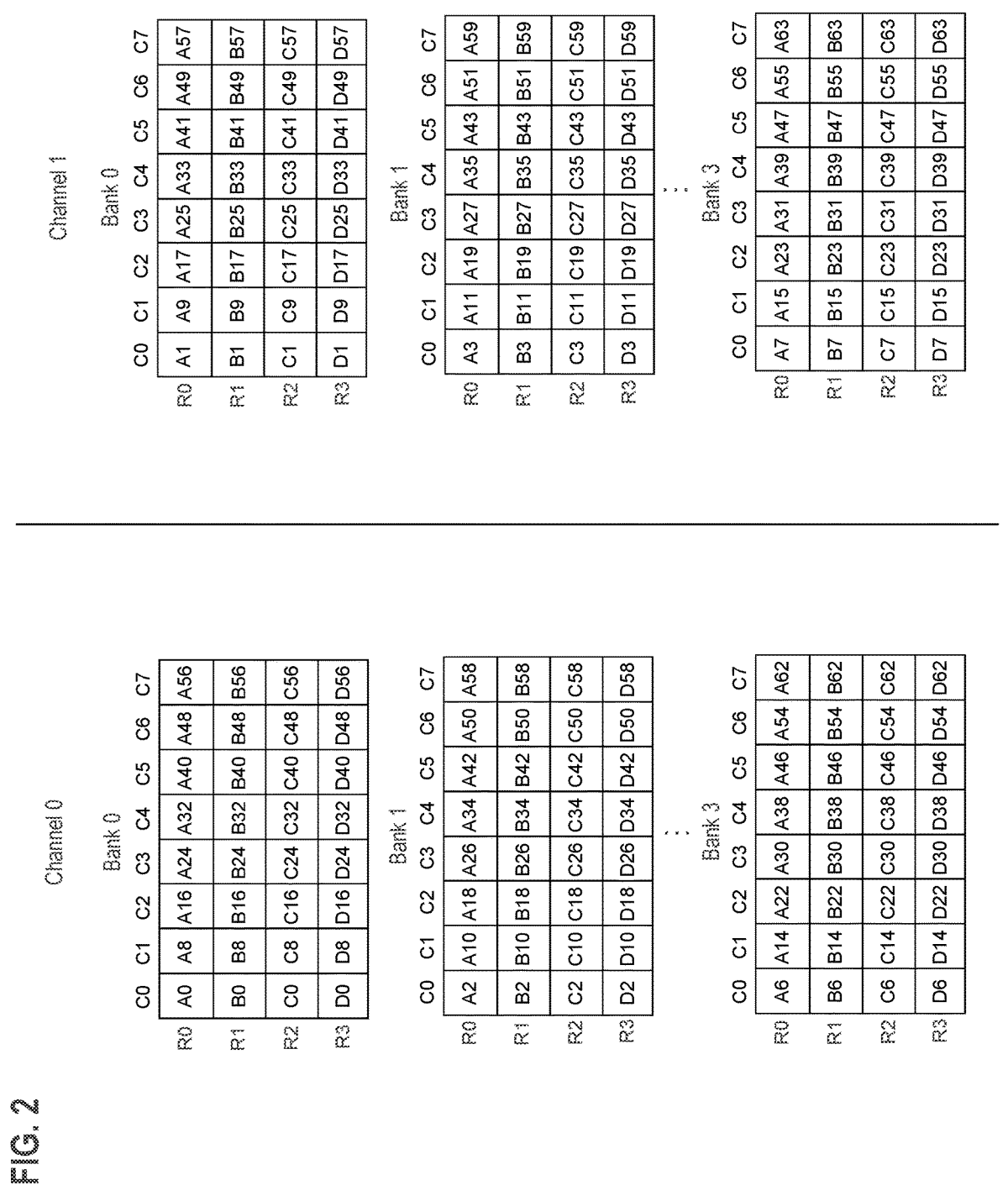

FIG. 2 depicts a memory system with two channels—channel 0 and 1. Each channel has four banks—bank 0, 1, 2, and 3. It is assumed there is one rank per channel, i.e. all four banks of each channel constitute one rank. Each bank comprises a 4×8 memory array. In some embodiments, each bank is coupled to a separate PIM execution unit. In some embodiments, each bank of a channel is coupled to a same PIM execution unit. It is assumed that each cell of each memory structure holds one data element. Hence, the PIM-enabled memory with two channels can store 256 (2×4×4×8) data elements and can be represented by eight physical address bits. It is assumed that the physical address space has four frames (frames 0-3), and that four pages A, B, C, and D are placed into frames 0-3, respectively. Each page has sixty four data elements. With address interleaving memory mapping scheme, data elements from pages A, B, C, D are interleaved over the channels, and then inside each channel over the banks, and then inside each bank over the columns, and then over rows, i.e. the interleaving order is: channels, banks, columns and rows.

FIG. 2 depicts how the sixty-four data elements from each page are distributed over the memory system with the address interleaving memory mapping scheme. For example, for page A that includes sixty four data elements A0-A63, FIG. 2 shows data element A0 indexed in row 0, column 0 of Bank 0 of Channel 0. Data element A1 is placed in row 0, column 0 of Bank 0 of Channel 1. Data element A2 is placed in row 0, column 0 of Bank 1 of Channel 0. Data element A3 is placed in row 0, column 0 of Bank 1 of Channel 1, and so on.

Figure 3:
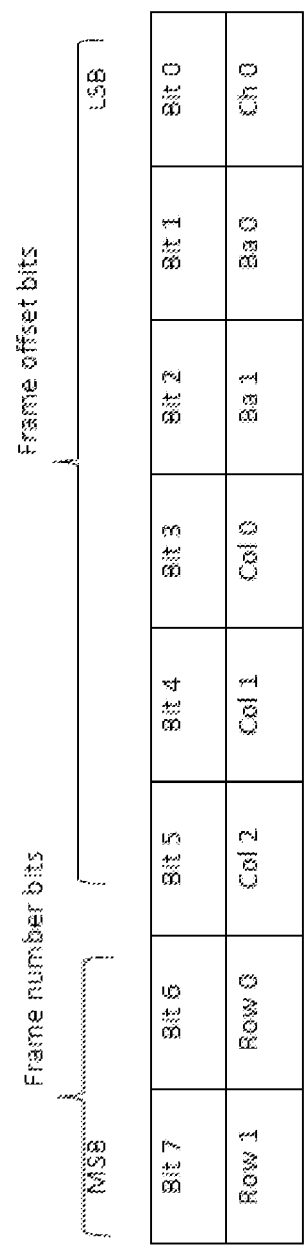
FIG. 3 depicts how physical address bits are mapped for indexing inside memory system depicted in FIG. 2.

FIG. 3 depicts how physical address bits are mapped for indexing inside the PIM-enabled memory using address interleaving memory mapping. For example, bit 0 represents a channel number. Bits 1 and 2 represent a bank number. Bits 3-5 represent a column number, Bits 6-7 represent a row number.

As an example of using the memory system depicted in FIG. 2 to perform a PIM operation, assume a PIM computation of adding two matrices elementwise and storing the result into a third matrix is to be performed. The matrices are defined as a, b, c and are stored into separate arrays and allocated in pages A, B and C, respectively. To perform the computation A[i]=B[i]+C[i], for every data element i in pages A, B, C, row R1 is opened to read i-th data element of B. The element is then stored into a temporary buffer. Row R2 is opened to read i-th data element of C. The addition of the data elements is then performed. The result of the addition is stored in the same temporary buffer. To store the result in the i-th data element of A, row R0 is opened and the result is stored. The same process is repeated inside each bank until all the data elements are processed.

Thus, to perform one single addition operation to generate one result element, three row-conflicts are encountered. The row conflicts impede PIM efficiency, both from timing and energy point of view. In this example, the PIM arithmetic/logic operation may require a single memory clock cycle, whereas each row-conflict may take 10s of memory clock cycles, making the data element placement a bottleneck in achieving high throughput.

B. Intra-Bank Frame Striping Policy

The Intra-Bank Frame Striping (IBFS) Policy maps data elements from consecutive frames to be co-located in the same row inside each bank. Data elements can be co-located in different ways depending upon the implementation. For example, corresponding subsets of data elements from consecutive frames can be interleaved into a single row or multiple rows of a bank. IBFS is explained with reference to example memory system depicted in FIG. 2. In this example, the physical address space has four frames, i.e. frame 0-3, and 4 pages—A, B, C, and D are allocated into the frames 0-3, respectively. For ease of explanation, a single bank is used to illustrate an example of IBFS.

Assume bank-0 of channel-0 from FIG. 2 is used to illustrate IBFS. FIG. 4A shows bank-0 of channel-0 with address interleaving memory mapping scheme as discussed with respect to FIG. 2. FIG. 4B shows bank-0 of channel-0 from FIG. 4A with IBFS address mapping. As depicted in FIG. 4B, with IBFS mapping, to perform the computation: A[i]=B[i]+C[i], for one data element i in pages A, B, C, one particular row is opened to read i-th data element of B. The data element is then stored into a temporary buffer. The i-th data element of C is also read from the same row. The addition of the data elements is then performed. The result of the addition is stored in the same temporary buffer. To store the result in the i-th data element of A, the result is stored in the same row. The same process is repeated inside each bank until all the data elements are processed.

Thus, using an IBFS mapping, only one row is required to be opened to perform an operation of the computation A[i]=B[i]+C[i]. For example, to perform the first operation of the computation A[i]=B[i]+C[i], i.e. the operation of the computation when i=0, only row R0 and data elements B0, C0, and A0 from row R0 are required. Additionally, using the IBFS mapping, a second operation of the computation A[i]=B[i]+C[i], e.g. when i=8, can be performed using data elements A8, B8, C8 from the same row R0. For the computation A[i]=B[i]+C[i], a per-bank PIM configuration achieves up to 6× reduction in number of row-conflicts using IBFS compared to previous technique using address interleaving mapping for the memory system of FIG. 2. Hence, the PIM throughput is greatly improved using the IBFS mapping.

To implement an IBFS policy, a number of stripes (NoS) is defined that indicates the number of frames that are to be to co-located in each row of a bank. Each such consecutive group of frames is referred to as a superset of frames. As depicted in FIG. 4B, row R0 includes an equal number of data elements coming from 4 consecutive frames, i.e., 2 data elements from each of the pages A, B, C, and D. The data elements are placed inside each row in a 'striped' form where each stripe includes elements from a single page. As depicted in FIG. 4B, NoS is 4 and each stripe size is 2. All of the rows (e.g. R0 to R3) used to hold data elements from each of the pages A, B, C, and D follow the NoS and stripe size parameters, and such set of rows is referred to as a superset of rows. Thus, the 8 data elements from page A (e.g. A0, A8, A16, A24, A32, A40, A48, and A56) which would have placed into row R0 using address interleaving memory mapping scheme, are distributed over the superset of rows R0 to R3 (e.g. A0, A8 to R0; A16, A24 to R1; A32, A40 to R2, and A48, A56 to R3) using an IBFS mapping. Similarly, data elements from pages B, C, and D are distributed over the rows of the superset. Inside each row, the stripe starting position of the data elements coming from the different frames depends on relative position of the frame with respect to the first frame in the superset.

The following equations are used to provide the row index values and column index values inside physical memory as per IBFS mapping. The same bits of physical address as depicted in FIG. 3 are used for row and column addressing, but to decode the bits, different equations are utilized by a memory controller. The below equations are functions of external parameters such as operating system page size and NoS. The equations are flexible and are able to be used in memory systems with different parameters. They are shown here for systems where all the parameters are powers of 2. Extension to support parameters that are not powers of 2 should be evident to those skilled in the art. Additionally, example memory system parameters and operating system parameters along with sample calculations are shown below:

Memory system specific parameters:
bank_size=32
total_bank=bank_per channel×total_channel=4×2=8
row_per_bank=4
col_per_row=8
OS/user specific parameters:
frame_size (i.e. page size)=64
number_of_stripes=4
Necessary calculations:

$$stripe\_size=col\_per\_row/number\_of\_stripes=8/4=2$$

$$frame\_per\_bank=bank\_size/(frame\_size/total\_bank)=32/(64/8)=4$$

$$row\_per\_frame\_per\_bank=row\_per\_bank/frame\_per\_bank=4/4=1$$

Necessary equations for IBFS mapping:

$$IBFS\_col\_addr=IBFS\_col\_base+IBFS\_col\_offset$$

$$IBFS\_col\_base=relative\_frame\_position \times stripe\_size = (frame\_number \% number\_of\_stripes) \times stripe\_size$$

$$IBFS\_col\_offset=col\_addr \% stripe\_size$$

$$IBFS\_row\_addr=IBFS\_row\_base+IBFS\_row\_offset\_1+IBFS\_row\_offset\_2$$

$$IBFS\_row\_base=super\_set\_number \times row\_per\_frame\_per\_bank \times number\_of\_stripes = (frame\_number/number\_of\_stripes) \times row\_per\_frame\_per\_bank \times number\_of\_stripes$$

$$IBFS\_row\_offset\_1=(row\_addr \% row\_per\_frame\_per\_bank) \times number\_of\_stripes$$

$$IBFS\_row\_offset\_2=col\_addr/stripe\_size$$

In some embodiments, for the above equations, frame size is multiple of total_bank×col_per_row. Number of stripes (NoS) is a power of 2, maximum allowed is col_per_row. col_addr and row_addr refer to basic binary numbers represented by column and row address bits, respectively. In one embodiment, all the operations are integer operations.

C. Intra-Channel Frame Striping Policy

Intra-Channel Frame Striping Policy (ICFS) maps data elements from consecutive frames to be co-located in the corresponding rows over the banks of each channel. Data elements can be co-located in different ways depending upon the implementation. For example, corresponding subsets of data elements from consecutive frames can be interleaved into a single channel row or multiple channel rows of a channel. ICFS is explained with reference to example memory system depicted in FIG. 2. In this example, the physical address space has 4 frames, i.e. frames 0-3, and 4 pages—A, B, C, and D are allocated into the frames 0-3, respectively. For ease of explanation, a single channel is used to illustrate an example of ICFS.

Assume channel-0 from FIG. 2 is used to illustrate ICFS. FIG. 5A shows channel-0 with address interleaving memory mapping scheme as discussed with respect to FIG. 2. FIG.

5B shows channel-0 from FIG. 2 with an ICFS address mapping. As depicted in FIG. 5B, with ICFS mapping, to perform the computation A[i]=B[i]+C[i] for one element i in pages A, B, C, one particular row of bank 1 is opened to read i-th data element of B. The data element is then stored into a temporary buffer. One particular row of bank 2 is opened to read i-th data element of C. The addition of the data elements is then performed. The result of the addition is stored in the same temporary buffer. To store the result in the i-th data element of A, one particular row of bank 0 is opened and the result is stored back to that row of bank 0.

Thus, using an ICFS mapping, only 3 rows over 3 different banks are required to be opened to perform an operation of the computation A[i]=B[i]+C[i]. For example, to perform the first operation of the computation A[i]=B[i]+ C[i], i.e. the operation of the computation when i=0, only row R0 from bank 0, row R0 from bank 1, and row R0 from bank 2 for data elements A0, B0, and C0 from the corresponding rows are required. Additionally, using the ICFS mapping, 7 additional operations of the computation A[i]=B[i]+C[i], e.g. when i=8, 16, 24, 32, 40, 48, and 56 can be performed using the same set of rows over the 3 banks. For the computation A[i]=B[i]+C[i], a per-channel PIM system achieves up to 24× reduction in number of row-conflicts using ICFS compared to previous technique using address interleaving mapping for the memory of FIG. 2. Hence, the PIM throughput is greatly improved using ICFS mapping.

To implement an ICFS policy, a channel-level view of a row is utilized, referred to as a 'channel row'. A channel row comprises a same row from all the banks of a respective channel. For example, from FIG. 5B, a channel row comprises R0 from bank 0, R0 from bank 1, R0 from bank 2, and R0 from bank 3. A channel level-view of a row is contrasted by a bank-level view of a row, referred to as a 'row' or 'bank row', which is utilized for the IBFS mapping.

A number of stripes (NoS) is defined that indicates how many frames are to be co-located in each channel row. Each such consecutive group of frames are referred to as a superset of frames. As discussed above, all of the same-numbered bank rows are viewed together as a channel row, e.g., row R0 of bank 0, 1, 2, and 3 are viewed together as channel row R0. In ICFS mapping, a bank row is viewed as one single unit and stripe-size is measured using this unit.

As depicted in FIG. 5B, channel row R0 includes an equal number of bank row sized data elements from 4 consecutive frames, i.e. 1 such element from each of the pages A, B, C, and D, and placed in a 'striped' form over the banks where each stripe includes elements from a single page. As depicted in FIG. 5B, NoS is 4 and each stripe size is 1. All the channel rows (R0 to R3) used to hold data elements from each of the pages A, B, C, D follow the NoS and stripe size parameters, and such set of channel rows is referred to as a superset of channel rows. Thus, the 4 bank row sized data elements from page A, which would have placed into channel row R0 using address interleaving memory mapping scheme, are distributed over the superset of channel rows R0 to R3 (e.g. R0 of Bank 0 to channel row R0, R0 of Bank 1 to channel row R1, R0 of Bank 2 to channel row R2, and R0 of Bank 3 to channel row R3) using ICFS mapping. Similarly, data elements from pages B, C, and D are distributed over the channel rows of the superset. Inside each channel row, the stripe starting position of the data elements coming from the different frames depends on relative position of the frame with respect to the first frame in the superset.

The following equations are used to provide the row index values and bank index values inside physical memory as per ICFS mapping. The same bits of physical address as depicted in FIG. 3 are used for row and bank addressing, but to decode the bits, different equations are utilized by a memory controller. The equations are functions of external parameters such as OS page size and NoS. The equations are flexible and are able to be used in memory systems with different parameters. They are shown here for systems where all the parameters are powers of 2. Extension to support parameters that are not powers of 2 should be evident to those skilled in the art. Additionally, example memory system parameters and operating system parameters along with sample calculations are shown below:

Parameters specific to memory system:
channel_size=16
total_channel=2
CL_row_per_channel (channel row per channel)=4
bank_per_CL_row=4
Parameters chosen by user:
frame_size (i.e. page size)=8
number_of_stripes=4
Necessary calculations:

$$stripe\_size=bank\_per\_CL\_row/number\_of\_stripes=4/4=1$$

$$frame\_per\_channel=channel\_size/(frame\_size/total\_channel)=16/(8/2)=4$$

$$CL\_row\_per\_frame\_per\_channel=CL\_row\_per\_channel/frame\_per\_channel=4/4=1$$

Necessary equations for ICFS mapping:

$$ICFS\_bank\_addr=ICFS\_bank\_base+ICFS\_bank\_offset$$

$$ICFS\_bank\_base=relative\_frame\_position \times stripe\_size=(frame\_number\ \%\ number\_of\_stripes) \times stripe\_size$$

$$ICFS\_bank\_offset=bank\_addr\ \%\ stripe\_size$$

$$ICFS\_row\_addr=ICFS\_row\_base+ICFS\_row\_offset\_1+ICFS\_row\_offset\_2$$

$$ICFS\_row\_base=super\_set\_number \times CL\_row\_per\_frame\_per\_channel \times number\_of\_stripes=(frame\_number/number\_of\_stripes) \times CL\_row\_per\_frame\_per\_channel \times number\_of\_stripes$$

$$ICFS\_row\_offset\_1=(row\_addr\_CL\_row\_per\_frame\_per\_channel) \times number\_of\_stripes$$

$$ICFS\_row\_offset\_2=bank\_addr/stripe\_size$$

In some embodiments, for the above equations, frame size is multiple of total_channel×bank_per_channel. Number of stripes (NoS) is a power of 2, maximum allowed is bank_per_channel. bank_addr and row_addr refer to basic binary numbers represented by bank and row address bits, respectively. In one embodiment, all the operations are integer operations.

D. Implementation Details

IBFS and ICFS are incorporated in a memory controller alongside existing policies. The provided equations involve division/multiplication/modulo operations by power of two numbers, which can be efficiently achieved by shift operations. A memory controller is configured to use generic, IBFS and ICFS depending on non-PIM/per-bank PIM-enabled/per-channel PIM-enabled system. For example, for a system configuration where a PIM execution unit is coupled to a memory structure at a bank level, IBFS may be selected to be used by a memory controller. For a system configuration where a PIM execution unit is coupled to a memory structure at a channel level, ICFS may be selected to be used by a memory controller.

Parameters such as frame size and NoS are provided for a PIM-enabled memory system that utilized IBFS and ICFS. The choice of frame size is provided as per operating system specification. NoS is provided statically as per user preference at system startup time (e.g. via the basic input/output system) or dynamically to achieve flexibility.

Modifications in operating systems and compliers are made so that a PIM-enabled memory system can leverage the benefits of IBFS and ICFS. An operating system can be made aware of memory allocations (mallocs) being related to one another by receiving hints from the compiler. A programmer can provide hints to a compiler indicating which data structures are involved in PIM computations. The compiler then determines the related data structures that are participating together in PIM computations, referred to as PIM data structures. A complier chooses a number, where the number is equal or smaller than the NoS, of such PIM data structures and assigns a single color. Each set of PIM data structures is assigned a distinct color. Whenever a malloc call takes place for any such PIM data structure, the PIM data structure is assigned a necessary number of pages in virtual address space. The operating system is notified about the distinct color associated with the virtual pages, which is the color associated with the respective PIM data structure. At this point, no physical memory (frame) is allocated. When any other PIM data structure from the same set is malloced, the same process takes place. Next, when a program accesses any such pages, the operating system allocates physical memory for the requested pages with the same color in chunks of superset of frames. In the case each such data structure has n pages, then one superset of frames is allocated on-demand for the ith pages of the PIM data structures and then another superset of frames is allocated on-demand for the (i+1)th pages of the PIM data structures, and so on until the n-th page.

For example, consider page allocations for a[ ], b[ ] and c[ ] for the PIM computation a[ ]=b[ ]+c[ ]. Assume that each allocation requires 4 pages. All of the 12 (3×4) pages are assigned the color red. The operating systems ensures that page[i] of all allocations are similar, i.e., a demand for allocation of page[0] of a[ ] triggers allocation of page[0] for b[ ] and c[ ]. All of the allocation requests are fulfilled with consecutive frames falling in the same superset of frames. Instead of triggering allocation of page[0] of b[ ] and c[ ], allocation is triggered when the pages are demanded. However, frames are reserved for the non-allocated pages in the same superset of frames where page[0] of a[ ] has been allocated. To avoid fragmentation, any unused frames of the superset of frames can be returned to the operating system to be assigned in future requests.

When a program issues any PIM command that specifies a virtual address, the virtual address is translated to a physical address following a regular address translation process. The physical address is mapped in a PIM-friendly manner as the memory controllers are configured to employ IBFS and ICFS.

As discussed above, IBFS and ICFS can be implemented as a static or dynamic scheme. In the static scheme, the NoS is tied to any constant number (e.g. 2/4/8) at system startup time as per user preference. Memory structures are mapped with specified NoS and the mapping cannot be changed without restarting the system with different NoS. The static scheme does not require any extra steps other than those that have been proposed above.

The dynamic scheme provides flexibility and finer degree of control over memory mapping by allowing PIM-friendly address mapping for pages corresponding to PIM data structures as per user preference, and generic address mapping for other memory pages at the same time. As proposed above, a compiler identifies different sets of related PIM data structures with necessary NoS and marks each such set with a distinct color. At the time of physical memory allocation for the pages of any such sets, the above discussed operating system allocation process ensures a necessary superset of frames such that the superset contains a NoS number of frames. Any data structure and/or page can be associated with only one NoS value throughout its lifetime. Whenever any memory accesses, e.g., reading from storage file into these frames or writing back, or any accesses from processor cores, take place for these pages, the memory controller is always notified about the corresponding NoS information along with the physical memory address that is received at the memory controller after a virtual address to physical memory address translation for any given virtual address of a page. The memory controller recognizes the NoS information that is included with each such memory request and decodes the physical memory address per IBFS or ICFS. Therefore, the NoS information for each data structure/page must be tracked and communicated along with a physical memory address for any memory access request to the memory controller.

To achieve the communication of NoS information to the memory controller, four possible approaches are utilized: (i) Instruction-based approach and (ii) Page Table Entry (PTE)-based approach, (iii) configuration register approach, and (iv) a mode register based approach. In the instruction-based approach, the instruction set architecture (ISA) is extended to include specialized LOAD/STORE instructions to access any memory structures which are annotated by a user to be used in PIM computations. In a complier pass where the compiler first chooses the sets of related PIM data structures which will be accessed together with necessary NoS information, the compiler keeps track of the corresponding NoS information for each such memory structure, e.g., in its symbol table. Later, for these memory structures, as necessary, the complier emits specialized LOAD/STORE instructions (e.g., LOAD_PIM, STORE_PIM) with NoS information embedded in the instructions. In one embodiment, for memory systems supporting only IBFS or ICFS one at a time, no dynamic specifier is required to convey which one of the IBFS or ICFS needs to be employed by the memory controller. In other embodiment, for memory systems allowing both IBFS and ICFS dynamically, a single-bit Policy indicator information is embedded in the specialized LOAD/STORE instructions for PIM data structures along with NoS information to be used by the memory controller to choose between IBFS or ICFS. The Policy indicator is decided and managed by the complier similarly as NoS information discussed here.

The memory controller is equipped to recognize such specialized LOAD/STORE commands and find necessary NoS information from the received commands to decode the physical memory address mapping correctly as per IBFS or ICFS or generic address mapping. Depending on the implementation choice, different number of bits can be used to convey NoS information. For example, using only 2-bits, four different NoS values of 1, 2, 4, 8 can be encoded, where a NoS value of 1 indicates a default mapping policy such as address interleaving memory mapping scheme. For regular LOAD/STORE commands, where no NoS information is provided, the memory controller uses a NoS value of 1, defaulting to a default mapping policy such as address interleaving memory mapping scheme.

In the PTE-based approach, for each allocated page, a set of bits in a PTE are used to keep corresponding NoS information of the respective page. With only 2-bits it is possible to encode four different NoS values of 1, 2, 4, 8, where NoS value of 1 indicates a default mapping policy such as address interleaving memory mapping scheme. For any regular page which does not belong to any PIM computation, the default NoS value of 1 is stored. These bits in the PTE indicating NoS value are cached into translation lookaside buffer (TLB) entries along with a physical memory address. For any memory access request, along with the physical memory address, corresponding NoS information is included. When any such memory request reaches the memory controller, the memory controller recognizes the included NoS information along with each such memory request and decodes the physical memory address mapping as per IBFS or ICFS or generic address mapping. In one embodiment, for memory systems supporting only IBFS or ICFS one at a time, no dynamic specifier is required to convey which one of the IBFS or ICFS needs to be employed by the memory controller. In other embodiment, for memory systems allowing both IBFS and ICFS dynamically, a single-bit Policy indicator information is included in any memory access request along with NoS information to be used by the memory controller to choose between IBFS or ICFS. The Policy indicator is chosen and managed similarly as NoS information in the PTE-based approach.

In the configuration register based approach, for ranges of physical memory addresses storing PIM data structures, one or more configuration registers associated with the memory controller are used to keep corresponding NoS information of the respective physical address range. Aggregation of PIM data structures into ranges of physical addresses and the programming of the one or more configuration registers with NoS information is managed by software (e.g., operating system) or by the hardware. With only 2-bits it is possible to encode four different NoS values of 2, 4, 8, 16. As the configuration registers only hold address ranges that hold PIM data structures, this approach does not require explicitly storing an indicator for a default mapping policy such as address interleaving memory mapping scheme. For any memory access request received at the memory controller, the associated physical memory address is used to query the configuration registers. If the address falls within a range programmed in the one or more configuration registers, corresponding NoS information from that configuration register is associated with the memory access. For any regular access which does not access PIM data structures, the configuration registers will not hold an entry and a default mapping, such as a NoS value of 1, is used. The memory controller recognizes the NoS information and decodes the physical memory address mapping as per IBFS or ICFS or generic address mapping. In embodiments where memory systems support both IBFS and ICFS dynamically, a single-bit Policy indicator information is also kept in the configuration registers along with NoS information to indicate which one of the IBFS or ICFS needs to be employed by the memory controller for the corresponding physical address range. The Policy indicator is chosen and managed similarly as NoS information in the configuration register based approach.

In the mode register based approach, the software running on a processor or hardware writes a single mode register associated with the memory controller with NoS information for all subsequent memory accesses. With only 2-bits it is possible to encode four different NoS values of 1, 2, 4, 8, where NoS value of 1 indicates a default mapping policy such as address interleaving memory mapping scheme. In one embodiment, all memory accesses following the programming of the mode register use the NoS information from the mode register. The mode register may be updated by software as frequently as is necessary to change the NoS information associated with subsequent memory accesses. In another embodiment, instead of a single mode register, the memory controller has a mode register for each memory request generator (e.g., each core or each thread) in the system. In such an embodiment, the settings from each mode register are only applied to the memory requests originating from the associated requestor. In embodiments where memory systems support both IBFS and ICFS dynamically, a single-bit Policy indicator information is also written in the mode register along with NoS information to indicate which one of the IBFS or ICFS needs to be employed by the memory controller for the subsequent memory accesses. The Policy indicator is chosen and managed similarly as NoS information in the mode register based approach.

The proposed hardware/software collaborative address mapping schemes provide a reduction in number of row activations while accessing data elements corresponding to large data structures which are accessed together with IBFS and ICFS policies, respectively as compared to previous schemes for the memory system of FIG. 2. Such reductions lead to superior PIM performance and energy efficiency.

E. Example Procedure

Figure 6:
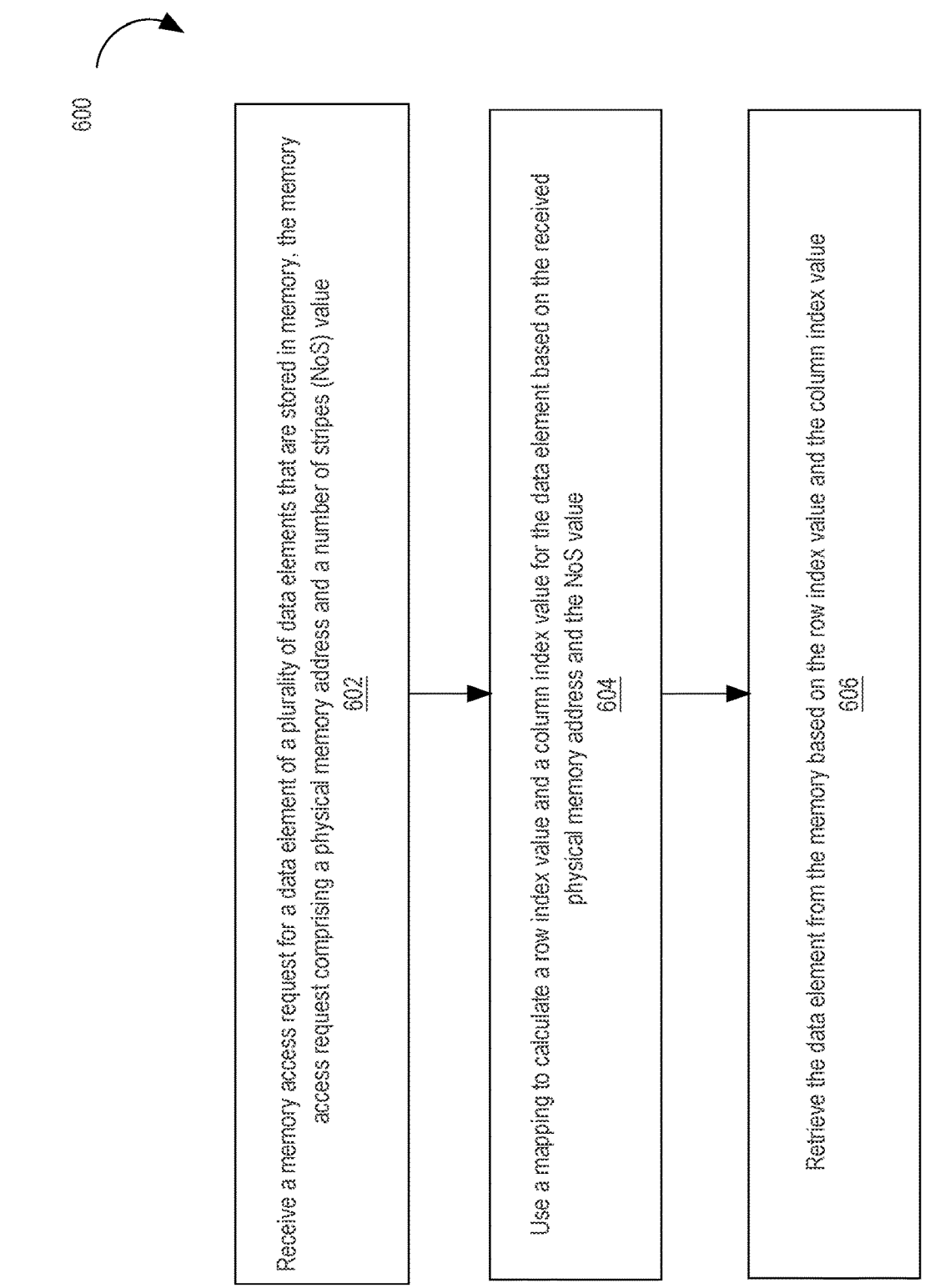
FIG. 6 is a flow diagram that depicts an approach for accessing memory using IBFS and ICFS address mappings.

FIG. 6 is a flow diagram 600 that depicts an approach for accessing memory using IBFS and ICFS address mappings. For purposes of example, FIG. 6 is discussed with respect to the architecture depicted in FIG. 1.

In step 602, a memory access request for a data element of a plurality of data elements that are stored in memory is received by the memory controller 102. In some embodiments, the memory comprises processing-in-memory (PIM)-enabled memory. The memory access request comprises a physical memory address and a number of stripes (NoS) value. For example, a host processor transmits a memory access request and transmit the request to the memory controller 102.

In one embodiment, the NoS value is derived from a specialized instruction set architecture (ISA) instruction. In another embodiment, the NoS value is derived from one or more bits of a page table entry (PTE). In another embodiment, the NoS value is derived from one or more configuration registers associated with a range of physical memory addresses that includes the physical memory address of the request. In another embodiment, the NoS value is derived from a mode register associated with the memory controller.

In step 604, using a mapping, a row index value and a column index value are calculated for the data element by the memory controller 102 based on the received physical memory address and the NoS value. For example, memory controller 102 uses mapping logic 110 to calculate a row index value and a column index value of the data element.

In one embodiment, the mapping comprises an IBFS mapping. In such an embodiment, the memory comprises a plurality of banks, each bank of the plurality of banks including a plurality of rows, a plurality of columns, and a corresponding execution unit. In some embodiments, the memory comprises PIM-enabled memory and, the corresponding execution unit comprises a PIM execution unit. The plurality of data elements is stored in the memory by, for a particular bank of the plurality of banks, grouping data elements of the plurality of data elements that correspond to separate operands of a computation into a single row of the plurality of rows of the particular bank.

In another embodiment, the mapping comprises an ICFS mapping. In such an embodiment, the memory comprises a plurality of channels, each channel of the plurality of channels including a plurality of banks, a plurality of channel rows, and a corresponding execution unit. In some embodiments, the memory comprises PIM-enabled memory and the corresponding execution unit comprises a PIM execution unit. Each channel row of the plurality of channel rows comprises a same row from all the banks of the plurality of banks of the respective channel of the plurality of channels. The plurality of data elements is stored in the memory by, for a particular channel of the plurality of channels, grouping data elements of the plurality of data elements that correspond to separate operands of a computation into a single channel row of the plurality of channel rows for the particular channel.

In step 606, the data element is retrieved from the memory by the memory controller 102 based on the row index value and the column index value. In one embodiment, for IBFS, the memory controller 102 transmits the row index value to the row decoder 112 and the column index value to the column decoder 114 to open a row and access a data element. In another embodiment, the memory structure 108 is seen as a channel with a plurality of banks and, for ICFS, the memory controller 102 transmits a bank index value to choose a bank from the plurality of banks and then transmits row index value and column index value to open a row and access a data element. The PIM execution unit 106 aggregates such data elements, performs necessary operations and transmits the results to the memory structure 108 and/or to the memory controller 102.

In one embodiment, for memory systems supporting only one of IBFS or ICFS at a time, no dynamic specifier is required to convey which one of the IBFS or ICFS needs to be employed by the memory controller. In other embodiment, for memory systems allowing both IBFS and ICFS dynamically, policy indicator information is conveyed along with NoS information to be used by the memory controller to choose between IBFS or ICFS. The policy indicator information is decided and managed similarly as NoS information discussed herein.

F. Applications

In some embodiments, techniques such as IBFS and ICFS can be useful when applied to various machine learning (ML) applications. For example, ML applications implementing deep neural networks (DNNs) commonly use operations such as adding two large matrices element-wise and storing the result into another matrix (e.g., A[i]=B[i]+ C[i]). In DNNs that use residual units with multiple layers as building blocks, one layer of each residual unit may perform element-wise matrix addition operations. Using IBFS and ICFS techniques, if corresponding subsets of data elements of such matrices (e.g., A[ ], B[ ], C[ ]) are interleaved in the same DRAM bank-level or channel-level row, fewer row-conflicts are encountered while accessing these data elements to perform element-wise matrix addition operations. Thus, IBFS and ICFS allow DNNs to execute the same operations with fewer row-conflicts, effectively increasing the speed of various ML applications.

The invention claimed is:

1. A memory controller communicatively coupled to memory having a plurality of banks, each bank of the plurality of banks including a plurality of rows and a plurality of columns, the memory controller being configured to:
   interleave, for a particular bank of the plurality of banks, corresponding subsets of data elements of a plurality of data elements, stored in the memory, into a single row of the plurality of rows of the particular bank.

2. The memory controller of claim 1, wherein:
   each bank of the plurality of banks is associated with a corresponding execution unit;
   a particular execution unit corresponding to the particular bank performs a first operation of a computation based on the corresponding subsets of data elements interleaved into the single row of the plurality of rows of the particular bank; and
   the particular execution unit performs an additional operation of the computation based on the corresponding subsets of data elements interleaved into the single row of the plurality of rows of the particular bank.

3. The memory controller of claim 1, further configured to:
   in response to a memory access request for a particular data element of the plurality of data elements, the memory access request comprising a physical memory address and an associated number of stripes (NoS) value, decode the physical memory address based on the NoS value to generate a bank index, a row index value and a column index value for the particular data element.

4. The memory controller of claim 1, wherein the corresponding subsets of data elements of the plurality of data elements are stored in the particular bank based on a number of stripes (NoS) value that defines a number of frames to co-locate in a single row of the plurality of rows of the particular bank of the plurality of banks.

5. The memory controller of claim 4, wherein the NoS value is derived from one or more of: a specialized instruction set architecture (ISA) instruction, one or more bits of a page table entry (PTE), one or more bits of a configuration register, or one or more bits of a mode register.

6. The memory controller of claim 4, wherein multiple frames are co-located in each row of the plurality of rows of the particular bank of the plurality of banks based on the NOS value corresponding to each row.

7. The memory controller of claim 6, wherein each row of the plurality of rows of the particular bank of the plurality of banks includes one or more data elements of the plurality of data elements from each frame of the multiple frames;
   wherein each row of the plurality of rows of the particular bank of the plurality of banks wherein each row of the plurality of rows of the particular bank of the plurality of banks includes an equal number of data elements from each frame of the multiple frames.

8. The memory controller of claim 6, wherein the memory comprises processing-in-memory (PIM)-enabled memory and wherein a particular execution unit corresponding to the particular bank comprises a PIM execution unit.

9. A memory controller communicatively coupled to memory having one or more channels, each channel of the one or more channels including a plurality of banks and a plurality of channel rows, the memory controller being configured to:
   interleave, for a particular channel of the one or more channels, corresponding subsets of data elements of a plurality of data elements, stored in the memory, into a single channel row of the plurality of channel rows of the particular channel;

wherein each channel row of the plurality of channel rows comprises a same row from all of the banks of the plurality of banks of the respective channel of the one or more channels.

10. The memory controller of claim 9, wherein each channel of the one or more channels is associated with a corresponding execution unit;
wherein a particular execution unit corresponding to the particular channel performs a first operation of a computation based on the corresponding subsets of data elements interleaved into the single channel row of the plurality of channel rows of the particular channel;
wherein the particular execution unit performs an additional operation of the computation based on the corresponding subsets of data elements interleaved into the single channel row of the plurality of channel rows of the particular channel.

11. The memory controller of claim 9, further configured to:
in response to a memory access request for a particular data element of the plurality of data elements, the memory access request comprising a physical memory address and a number of stripes (NoS) value, decode the physical memory address based on the NoS value to generate a bank index value and a row index value for the particular data element.

12. The memory controller of claim 9, wherein the corresponding subsets of data elements of the plurality of data elements are stored in the particular channel based on a number of stripes (NoS) value that defines a number of frames to co-locate in a single channel row of the plurality of channel rows of each respective channel of the one or more channels.

13. The memory controller of claim 12, wherein the NOS value is derived from one or more of: a specialized instruction set architecture (ISA) instruction, one or more bits of a page table entry (PTE), one or more bits of a configuration register, or one or more bits of a mode register.

14. The memory controller of claim 12, wherein multiple frames are co-located in each channel row of the plurality of channel rows of the particular channel of the one or more channels based on the NOS value corresponding to each channel row.

15. The memory controller of claim 14, wherein each channel row of the plurality of channel rows of the particular channel includes one or more data elements of the plurality of data elements that are associated with each frame of the multiple frames;
wherein each channel row of the plurality of channel rows of the particular channel includes an equal number of data elements from each frame of the multiple frames.

16. The memory controller of claim 14, wherein each channel of the one or more channels is associated with a corresponding execution unit;
wherein the memory comprises processing-in-memory (PIM)-enabled memory and wherein a particular execution unit corresponding to the particular channel comprises a PIM execution unit.

17. A computer system comprising:
one or more processors; and
non-transitory computer-readable media storing one or more sequences of instructions that, when executed by the one or more processors, cause:
maintaining, in memory, a plurality of corresponding subsets of data elements, the memory having one or more channels, each channel of the one or more channels comprising a plurality of channel rows; and
executing a computation using a first data element of a first subset of the plurality of corresponding subsets of data elements and a second data element of a second subset of the plurality of corresponding subsets of data elements, said executing the computation comprising:
retrieving the first data element from a first location within a particular channel row of the plurality of channel rows within a particular channel of the one or more channels; and
retrieving the second data element from a second location within the particular channel row.

18. The computer system of claim 17, wherein:
each channel of the one or more channels comprises a plurality of banks; and
each channel row of the plurality of channel rows comprises a same row from all of the banks of the plurality of banks of the respective channel of the one or more channels.

19. The computer system of claim 17, wherein the memory comprises processing-in-memory (PIM)-enabled memory.

20. The computer system of claim 17, wherein each channel of the one or more channels further comprises a plurality of banks;
wherein at least a portion of the plurality of corresponding subsets of data elements is maintained in the memory by, for the particular channel, interleaving corresponding subsets of data elements, of the plurality of corresponding subsets of data elements, into a single channel row of the plurality of channel rows of the particular channel.

* * * * *